Nov. 19, 1963    A. C. MUELLER    3,111,073
CAMERA SHUTTER
Filed Dec. 19, 1960    8 Sheets-Sheet 1

Fig.1

Inventor
Arthur C. Mueller
By Robert F. Miehle, Atty.

Nov. 19, 1963     A. C. MUELLER     3,111,073
CAMERA SHUTTER Filed Dec. 19, 1960     8 Sheets-Sheet 3

Fig. 8

Inventor
Arthur C. Mueller
By Robert F. Miehle
Atty.

Fig. 12

United States Patent Office 3,111,073
Patented Nov. 19, 1963

3,111,073
CAMERA SHUTTER
Arthur C. Mueller, Maine Township, Cook County, Ill., assignor to Bell & Howell Company, Chicago, Ill., a corporation of Illinois
Filed Dec. 19, 1960, Ser. No. 76,886
7 Claims. (Cl. 95—11.5)

This invention relates to a camera shutter, and more particularly to a combined camera shutter and flash actuator.

An object of the invention is to provide a new, effective and simple camera shutter.

Another object of the invention is to provide a camera shutter in which a master control blade serves as one contact of a flash circuit and operates shutter blades and closes the flash circuit in synchronism.

Another object of the invention is to provide a shutter wherein an actuating member is released from its cocked position to strike and release a spring-pressed master control member and the master control member opens a pair of shutter blades and closes a flash circuit in synchronism therewith.

A complete understanding of the invention may be obtained from the following detailed description of a camera shutter forming a specific embodiment thereof, when read in conjunction with the appended drawings, in which.

The invention provides a camera shutter including a plurality of blades together with a lever normally urged to a position closing the blades and a manually releasable member adapted to sequentially drive the lever to a position opening the shutter blades and then release the lever to permit it to reclose the blades. Preferably the lever is electrically grounded and has a contact portion at one end thereof to engage a contact in a flash circuit to actuate a flash bulb as the shutter is opened. Preferably the entire shutter is mounted on a partition wall of the camera, and the manually releasable member is in the form of a lever mounted on the wall and held in cocked position by a plate slidable on the wall to release the member and having a portion interlocking with the member to prevent sliding the plate again in a shutter actuating direction until the member has been recocked by winding another frame of film into the exposure position.

Figure 1:
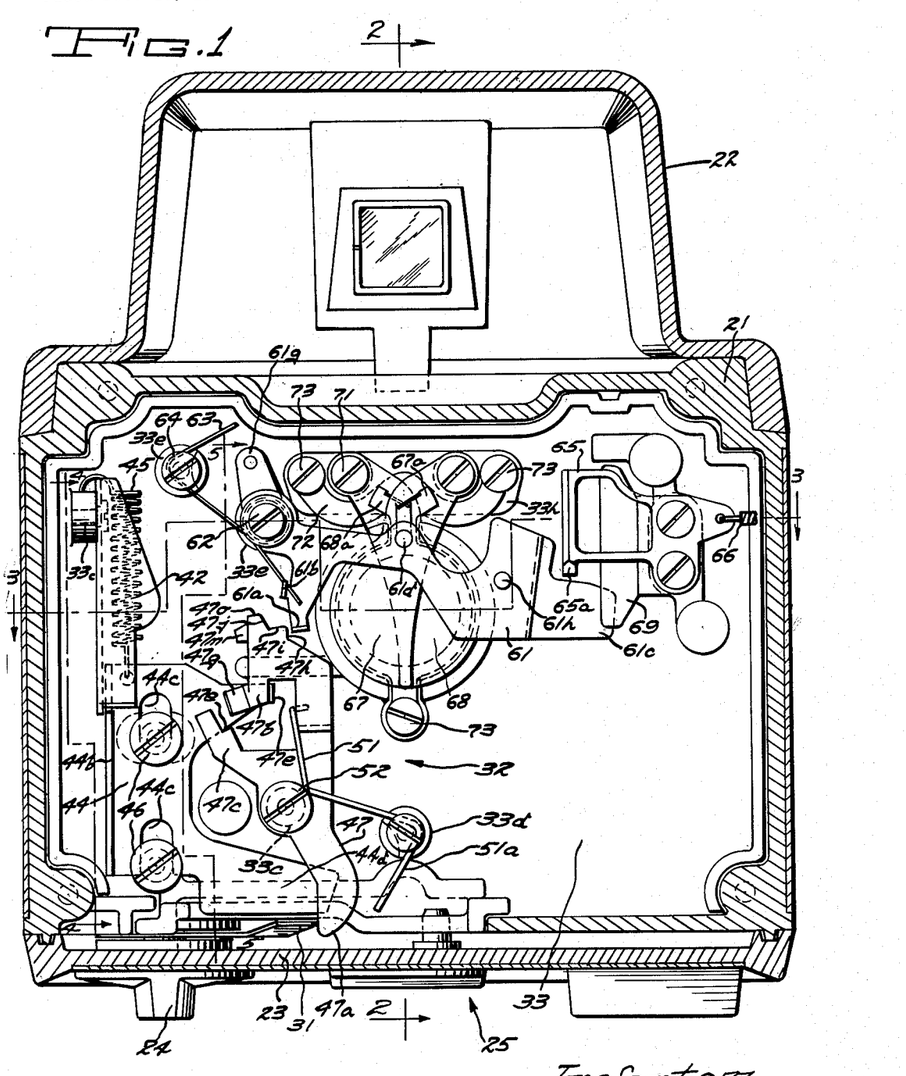
FIG. 1 is a vertical sectional view of a camera having a shutter forming one embodiment of the invention.
Figure 6:
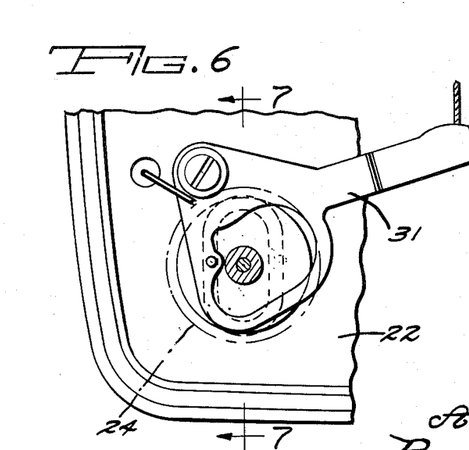
FIG. 6 is an enlarged, fragmentary, top plan view of the bottom of the camera of FIG. 1.
Figure 7:
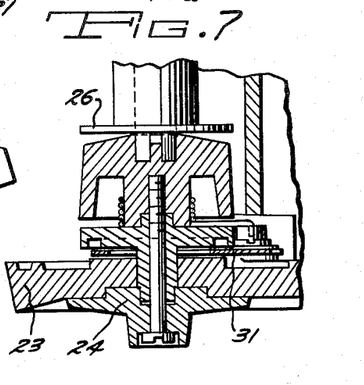
FIG. 7 is an enlarged vertical sectional view taken along line 7—7 of FIG. 6.

Referring now in detail to the drawings, there is shown in FIG. 1 a camera having a housing 21 with a viewfinder housing 22 at the top thereof and a removable bottom 23 carrying a winding knob 24 and a latching mechanism 25. When the knob 24 is rotated manually, it turns a film take-up spool 26 (FIG. 3) mounted rotatably on the bottom 23 to advance film from a supply spool 27 on the bottom 23 along a film pressing plate 28 and a framing aperture 29 at the back of a light tunnel 30 fixed on the bottom 23. When the take-up winding knob 24 is turned, it also oscillates a shutter-cocking leaf spring arm 31 (FIG. 6) to recock a shutter mechanism 32 (FIG. 4) as is described in detail below. The camera also includes a vertical partition wall 33, which serves as a mounting plate to mount the shutter mechanism 32 and a rear lens 34 in opening 33a. The lens 34 forms an optical objective with a front lens 35 mounted by a cell 36 in an opening 21a in front wall 21b of the housing 21.

Figure 4:
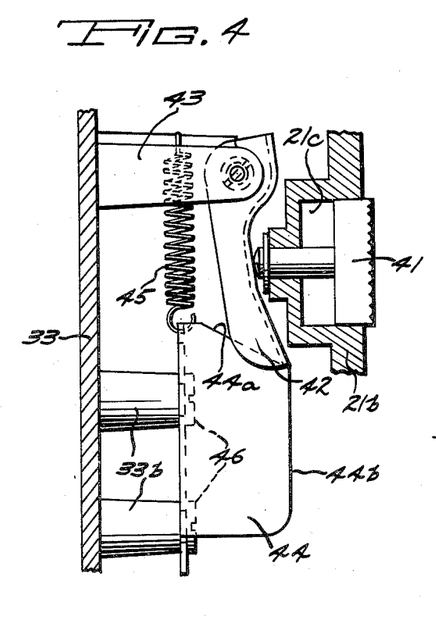
FIG. 4 is an enlarged vertical sectional view taken along line 4—4 of FIG. 1.
Figure 5:
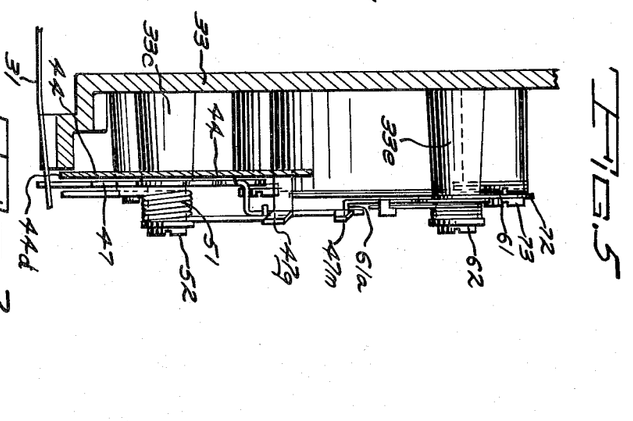
FIG. 5 is an enlarged vertical sectional view taken along line 5—5 of FIG. 1.

The shutter mechanism 32 is actuated manually by pushing a shutter-triggering button 41 to the left, as viewed in FIG. 4, the button being slidable in tubular guide 21c in the front wall 21b. The button 41 moves in a clockwise direction a flanged arm 42 mounted pivotally on bracket 43 fixed to the partition wall 33, and the flange of the arm 42 rides along a sloping upper edge 44a of a flange 44b of a triggering plate 44 and pushes the plate 44 downwardly against the action of spring 45 fastened to the plate 44 and a lug 33c on the wall 33. The plate 44 is mounted for straight line reciprocable movement on bosses or studs 33b by headed screws 46 projecting through slots 44c (FIG. 1) in the plate 44. As the plate 44 moves downwardly, a shoe 44d first presses the resilient arm 31 downwardly out of the path of cocking end 47a of shutter-actuating lever 47. Then the plate 44 moves forwardly projecting latching lug 44e out of latching engagement with the edge of a spring arm 47b of the lever 47 to release the lever 47 for shutter actuation.

Figure 9:
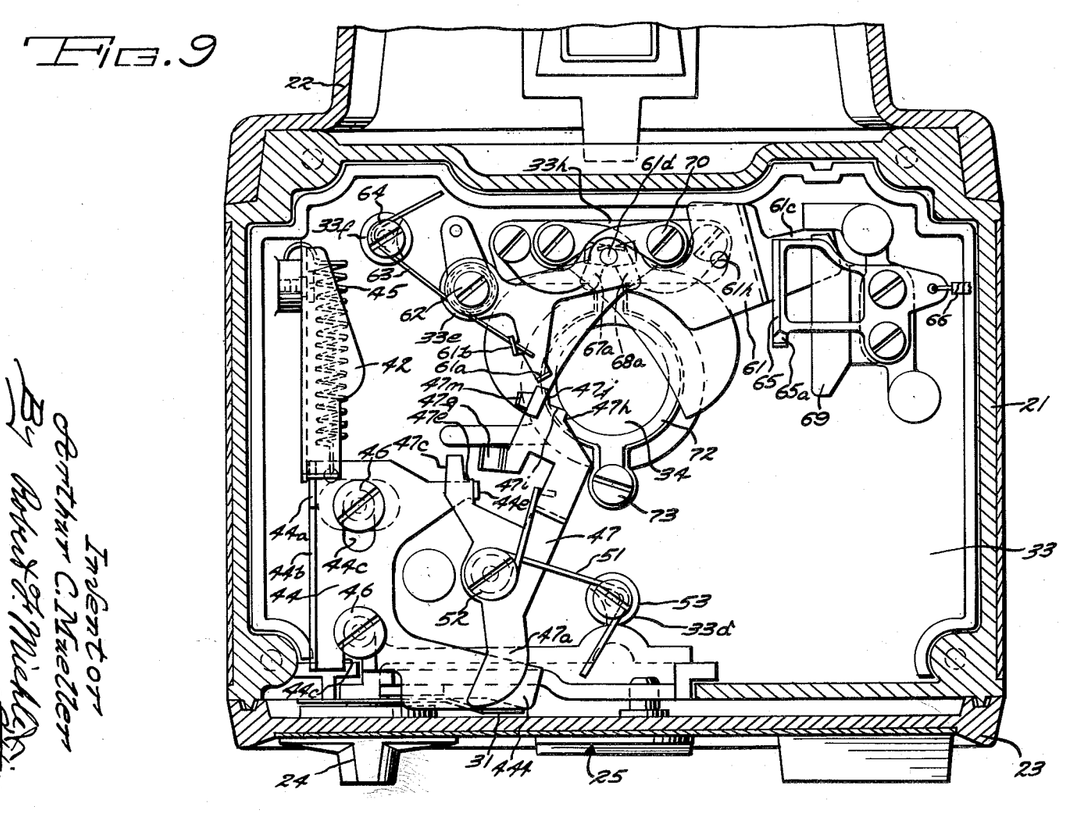
Figure 10:
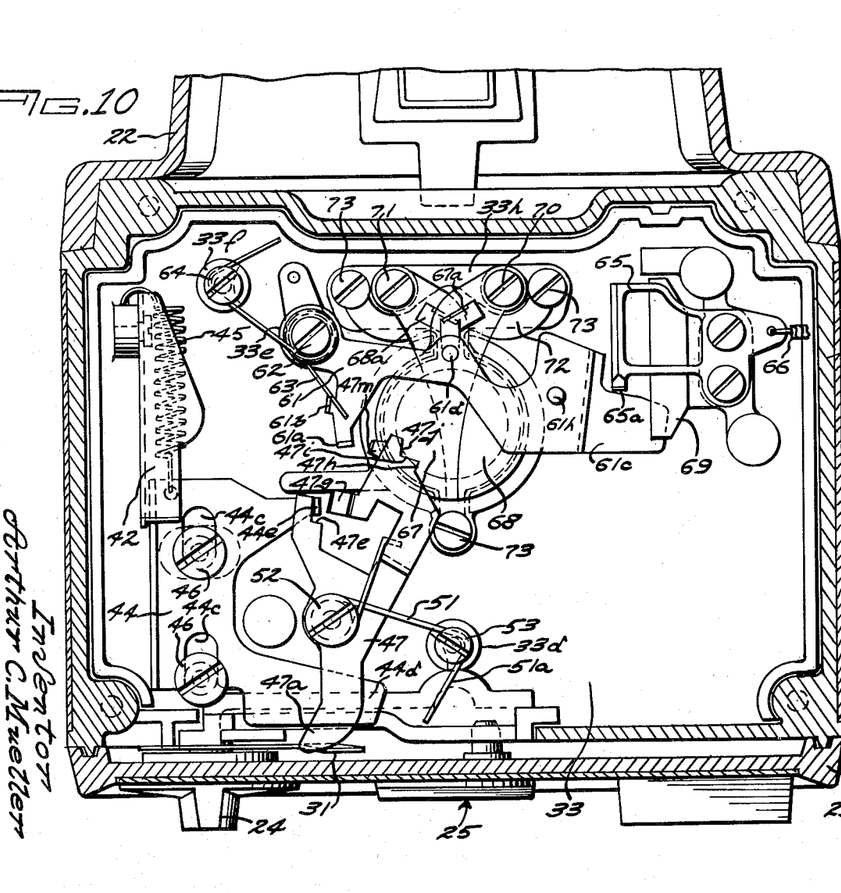
Figure 11:
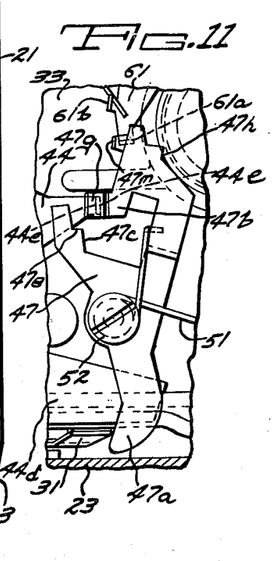
FIG. 11 is a fragmentary front elevation view of a portion of the shutter during cocking of the shutter.

When the lever 47 is released, a spring 51 coiled around a stud 33c on which the lever 47 is secured by screw 52 turns the lever 47 in a clockwise direction, as viewed in FIG. 1, through a shutter-operating stroke to the uncocked position thereof shown in FIG. 9. In this position, the lug 44e is engaged by a stepped arm 47c of the lever 47 to hold the lever against further movement by the spring 51. The tension on the spring 51 is regulated by the position of end 51a adjustably clamped between screw 53 and stud 33d. Then, as the user of the camera releases the button 41 (FIG. 3), the plate 44 is spring urged back up to the normal position thereof and step 47e of the finger 47c moves under the tab 44e as shown in FIG. 10. In this position, the shutter is uncocked, and the step 47e prevents downward movement of the plate 44 which in turn prevents depression of the button 41 (FIG. 3) by the user while the shutter is uncocked. Thus, actuation of the button is prevented so that the user will be apprised of the fact that the film must be advanced and the shutter recocked, which is effected by turning knob 24 (FIG. 10) to oscillate the arm 31, and the arm 31 engages the left hand edge of the recocking tip 47a, as shown in FIG. 11, and moves the lever 47 counter-clockwise back to its cocked position. As the lever is recocked, camming or ratchet portion 47g springs the arm 47b and the tab 44e past each other, and the tab 44e and arm 47b then spring into locking or latched engagement as illustrated in FIG. 1.

Figure 2:
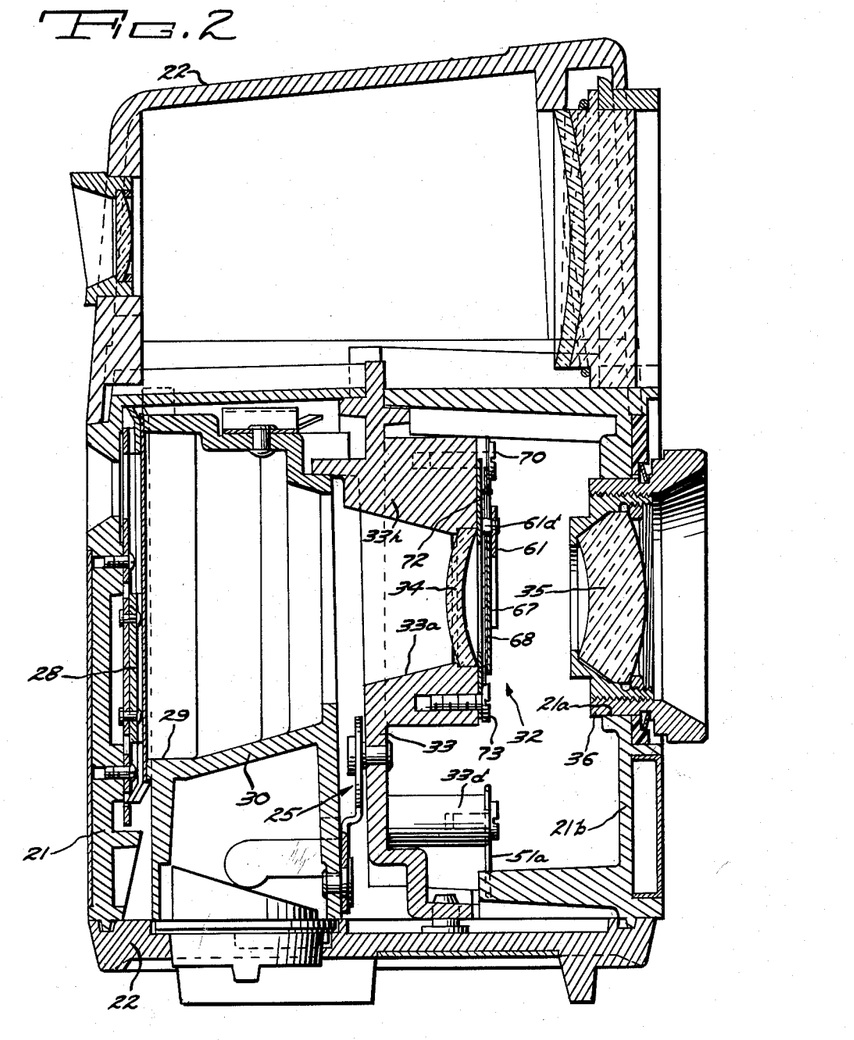
FIG. 2 is a vertical sectional view taken along line 2—2 of FIG. 1.
Figure 8:
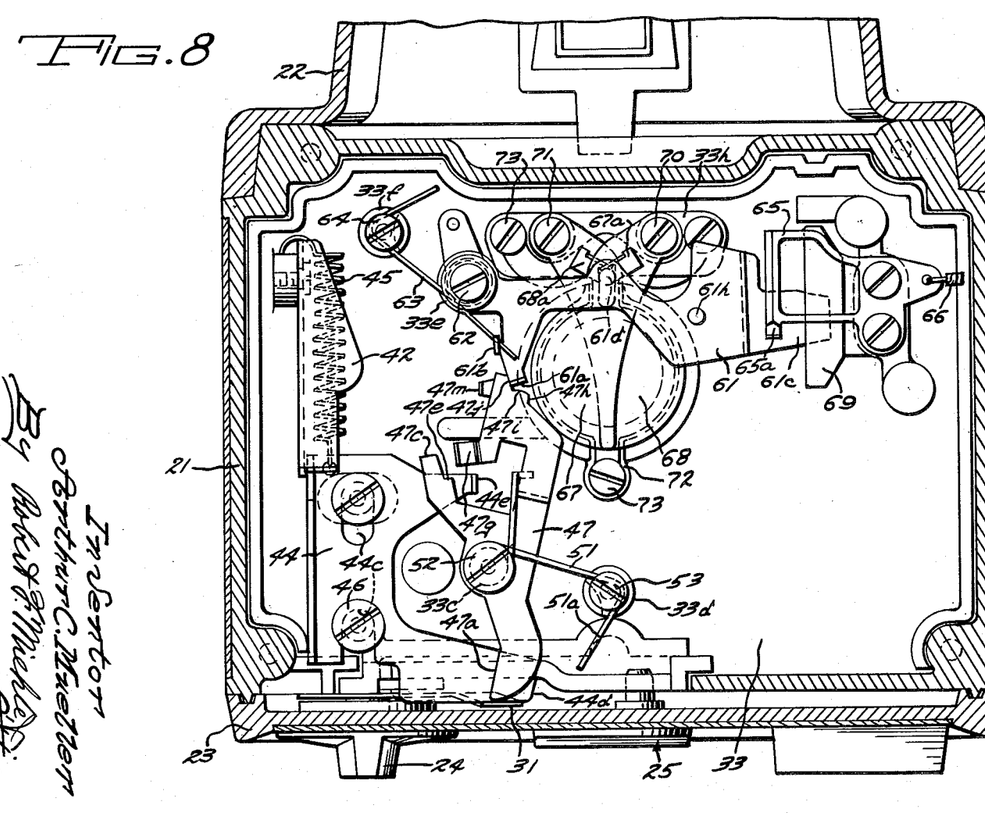
FIGS. 8, 9 and 10 are vertical sectional views of the shutter similar to FIG. 1 but showing the shutter during different stages of its operation.

When the plate 44 is released to trigger the lever 47 and the lever 47 is swung clockwise from its cocked position shown in FIG. 1, a step 47h first strikes a lug 61a of shutter control arm 61 mounted rotatably on screw 62 threaded into stud 33e. This drives the arm 61 counter-clockwise against spring 63 fastened at one end to lug 61b, wound around the stud 33e and clamped adjustably at its other end between screw 64 and tapped stud 33f, and just before the lug 61a moves up off the step 47h, a contact end 61c slides into contact with a contact 65 mounted on and electrically insulated from the wall 33 and connected by lead 66 to a known bulb-flashing mechanism (not shown). The arm 61 has a portion 61a, which may be connected to a grounding lead, if desired, or this lead may be connected to the wall 33, the arm 61 being electro-conductive and connected to the electro-conductive wall 33. This starts ignition of the flash bulb a predetermined time before shutter blades 67 and 68 are opened, a pin 61d carried rigidly by the arm 61 riding along dwell portions of L-shaped slots 67a and 68a of the blades at this time. Shortly after this preignition, the lug 61a moves up off the step 47h, rides along dwell edge 47i and is struck by step 47j as shown in FIG. 8, which then moves the arm 61 further counter-clockwise to open the blades 67 and 68, the step 47j moving on past the lug 61a to the position thereof shown in FIG. 9. Due to dwell portion 47o, the blades 67 and 68 remain open for a predetermined period of time to provide a predetermined exposure and then the dwell portion 47o moves away from lug 61a and the spring 63 swings the arm 61 back to its blade closing position. The outer or free end of the arm 61 is enlarged, and may be weighted by a slug or weight 61h to provide the inertia desired for timing. The arm 61 closes the blades 67 and 68 and then moves out of contact with the contact 65 to open the flash circuit, a guide 69 electrically insulated from the contact 65 serving to guide the contact end 61c during oscillation of the arm 61. The blades 67 and 68 are mounted pivotally on the wall 33 by screws 70 and 71 threaded into tapped bores in boss 33h. A strap-like plate 72 is secured by screws 73 in a position retaining the lens 34 (FIG. 3) and also serves as a bearing plate for the end of pin 61d as illustrated in FIG. 2, the end of the pin 61d slidably engaging the plate 72.

After the shutter blades 67 and 68 have been opened and reclosed and before recocking, the shutter mechanism is in the condition shown in FIG. 10 in which the lug 61a is in the recocking path of the lever 47. Then, as the lever 47 is recocked, a camming portion 47m springs the arm over the lug 61a as illustrated in FIG. 11, and the lever 47 moves completely on past the lug 61a. Tip 65a of the spring contact 65 slopes forwardly to permit the contacting portion 61c of the arm 61 to move behind contacting ridge 65b and spring the contact 65 forward to have spring pressure contact between the contact 65 and contact portion 61c.

Figure 3:
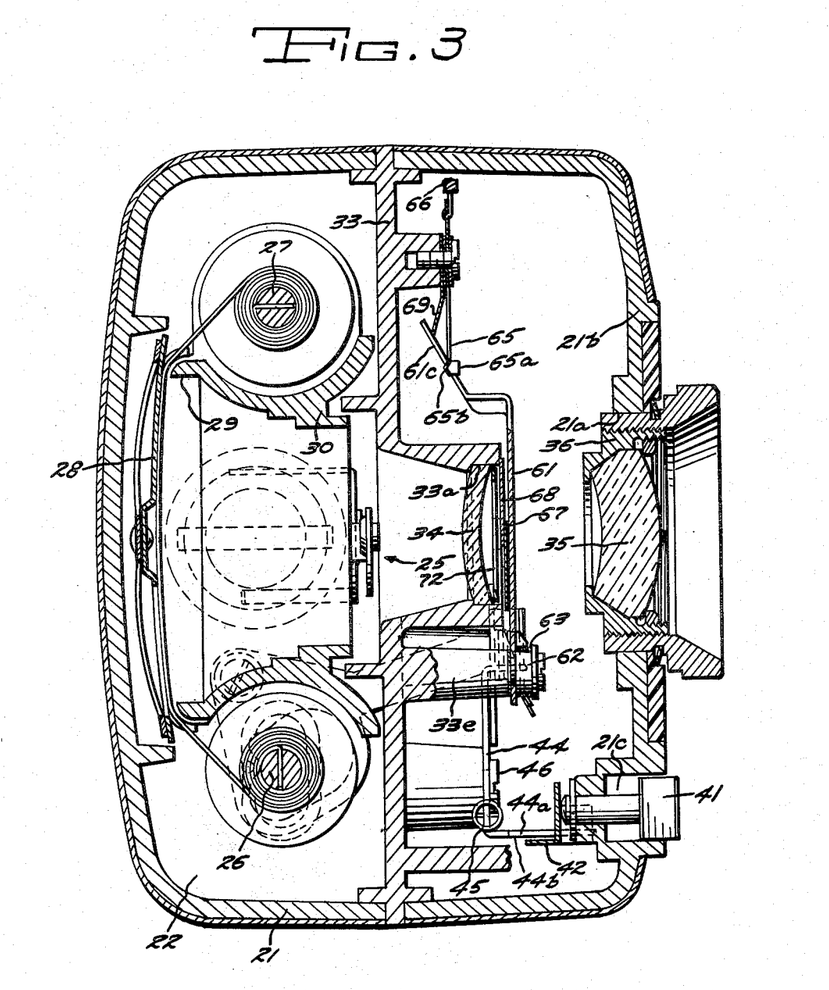
FIG. 3 is a horizontal sectional view taken along line 3—3 of FIG. 1.
Figure 12:
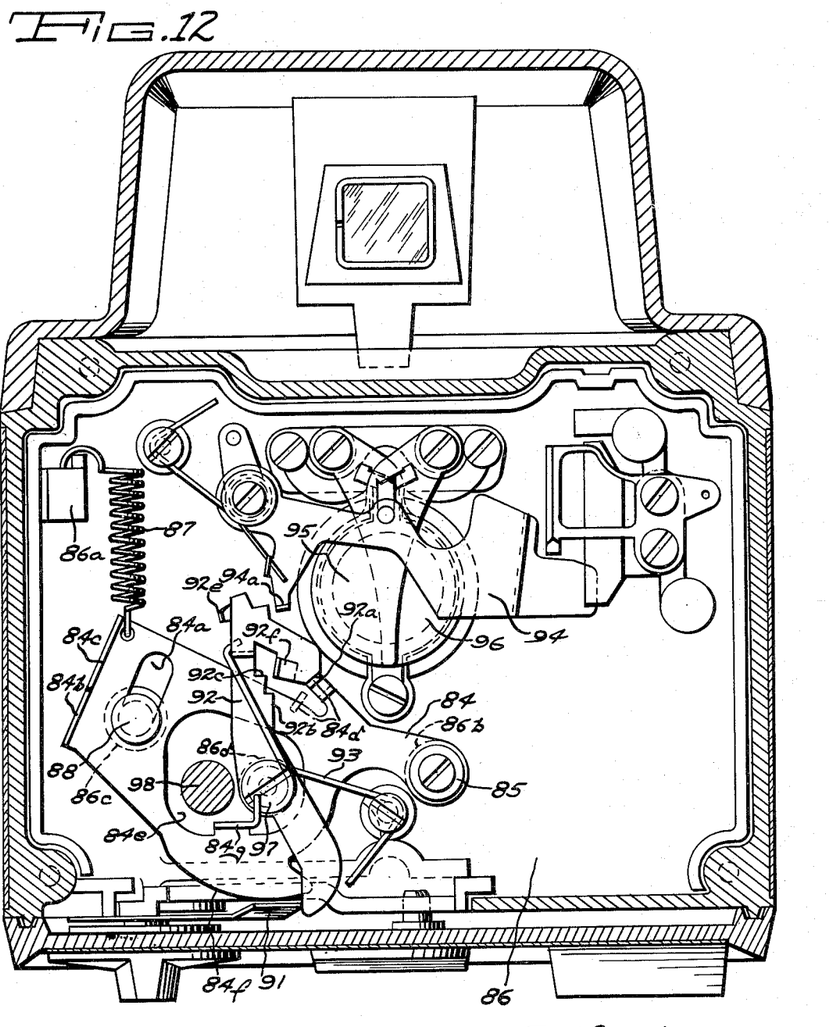
FIG. 12 is a vertical sectional view of a camera having a shutter forming an alternate embodiment of the invention.

The camera and shutter shown in FIG. 12 are generally like those shown in FIG. 1 except that the shutter of FIG. 12 includes an oscillatory pivotal triggering plate 84 as distinguished from the reciprocable triggering plate 44 of the shutter of FIG. 1. The plate 84 is pivotally mounted by a screw 85 on a boss 86b formed integrally with partition wall 86, and is urged clockwise by spring 87 fastened at its lower end to the plate 44 and at its upper end to a lug 86a on the plate 86. A headed stud 88 secured to the wall 86 projects through slot 84a in the plate 84 to hold the plate 84 slidably on boss 86c. The plate 84 has a forwardly projecting flange 84b having a sloping concave, actuating cam edge 84c, which is engaged by an arm (not shown) identical with the arm 42 (FIGS. 1 and 3). When the arm of the shutter of FIG. 12 is actuated manually to trigger the shutter, the plate 84 is swung counter-clockwise and, first, a cam edge 84f of the plate presses resilient shutter-cocking arm 91 (corresponding to arm 31 of FIG. 1) downwardly along edge 92a of shutter-actuating lever 92 out of the path of the edge 92a and then lug 84d is moved sufficiently toward its broken line position to release the lever 92. A spring 93 then swings the lever 92 clockwise to actuate arm 94 to close the circuit to the flash lamp and then open and close shutter blades 95 and 96. The lever 92 is pivotally mounted on stud 86d by screw 97. The plate 84 has a hole 84e providing clearance for a mounting boss 86f of the wall 86. A lug 84g is provided to control a diaphragm blade (not shown) of the needle-entrapment type of the type disclosed and claimed in co-pending application Serial No. 60,858, filed Oct. 6, 1960, by John P. Bagby, and assigned to the common assignee.

After the shutter of FIG. 12 is triggered, the user releases the push button and the spring 87 swings the plate 84 back to its normal position, the lug 84d sliding up and off edge 92b of the lever 92, the lever 92 then moving shoulder 92c under the lug 84d to prevent the operator from depressing the release button until the shutter has been recocked. The return of the plate 84 to its normal position releases the recocking arm 91, and, as a new frame of film is wound by the operator, the arm 91 swings the lever 92 back to its cocked position as shown in FIG. 12. As the lever 92 is cocked, it is sprung outwardly by camming tabs 92e and 92f riding over lugs 94a and 84d just before the edge 92a drops behind the lug 84d.

While the invention is thus described, it is not wished to be limited to the precise details described, as changes may be readily made without departing from the spirit of the invention.

What is claimed is:

1. In a shutter device, a mounting plate, a plurality of shutter blades pivotal relative to the plate, an actuating arm pivoted at one end thereof to said plate, said arm having means coupling a point on the arm intermediate the ends thereof to the blades, a contact portion at the other end of said arm, a contact mounted on the plate in the path of the contact portion for actuating a flash, and a manually releasable spring driven driving member for striking the arm to move the arm to open the blades.

2. The shutter device of claim 1 wherein the coupling means provides for lost motion during the initial portion of the movement of the arm in a blade opening direction, to cause engagement of the contact portion of the arm with the contact before the blades open.

3. The shutter device of claim 2 wherein the driving member is provided with a pair of striking portions for successively striking the arm.

4. The shutter device of claim 1 wherein the driving member is provided with a first striking portion to move the arm into engagement with the contact to cause pre-flash ignition and also has a second striking portion for moving the arm further to open the blades.

5. In a shutter device, a pair of blades, a pivotally mounted arm, pin-and-slot connecting means for connecting the arm to the blades for opening the blades when the arm is moved from a normal position to a second position and closing the blades when the arm is moved from its second position to its normal position, means urging the arm toward its normal position, a driving member having stepped striking portions for moving the arm in steps from its normal position to its second position, and a flash contact in the path of the arm at a point at which the arm contacts the contact during the initial portion of movement of the arm from its normal position.

6. The shutter device of claim 5 wherein the pin-and-slot connecting means provides lost motion between the arm and the blades during the initial portion of the movement of the arm from its normal position.

7. The shutter device of claim 5 including a manually operable slidable plate for latching the driving member in a cocked position and releasing the driving member, means urging the slidable plate toward a latching position, the driving member being provided with a portion movable into the path of the plate to prevent movement of the plate from its latching position when the driving member is not in its latched position, and means for moving the driving member to its latched position.

References Cited in the file of this patent

UNITED STATES PATENTS

| | | |
|---|---|---|
| 2,641,978 | Lawson | June 16, 1953 |
| 2,728,279 | Gebele | Dec. 27, 1955 |
| 2,838,983 | Burger | June 17, 1958 |
| 2,922,348 | Lawson | Jan. 26, 1960 |